Patented May 14, 1929.

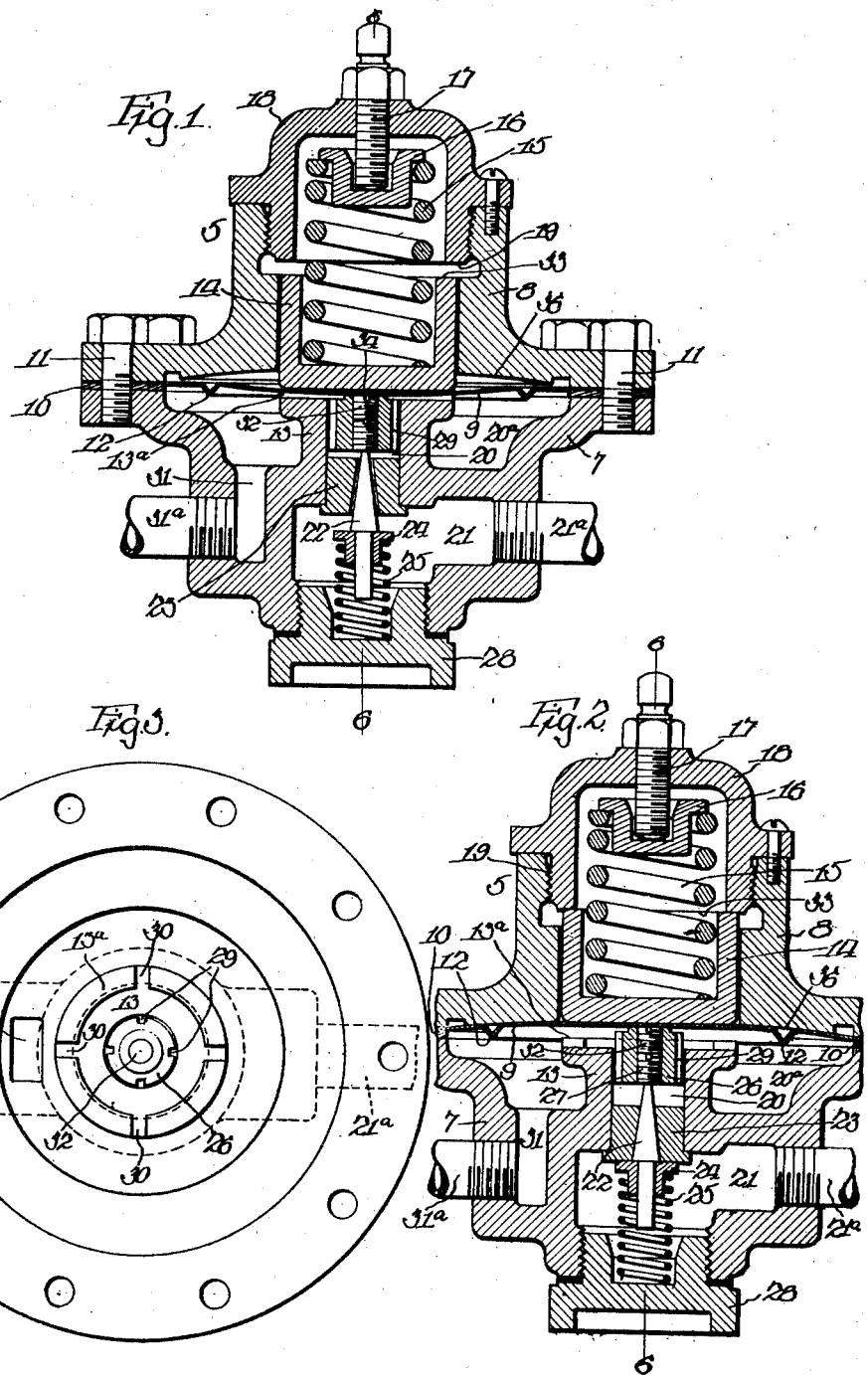

1,712,697

UNITED STATES PATENT OFFICE.

JULIUS FRANKENBERG, OF MILWAUKEE, WISCONSIN.

AUTOMATIC EXPANSION VALVE.

Application filed January 19, 1925. Serial No. 3,371.

This invention relates, generally, to valves, but has particular relation to that type thereof known as automatic expansion valves, and employed in connection with refrigerating apparatus using anhydrous ammonia or substances having similar properties, as a refrigerant, and it consists in certain peculiarities of the construction, novel arrangement and combination of the various parts thereof as will be hereinafter more fully set forth and specifically claimed.

Generally, or broadly speaking, the invention has for its main objects the provision of an expansion valve, more particularly for small refrigerating apparatus or plants, such as those used in meat markets and like places, using anhydrous ammonia or any other similar refrigerant, which embodies improvements in its construction whereby it shall be wholly automatic in its operation, thus dispensing with the necessity of the services of a skilled attendant; self-cleaning of the surplus oil carried over to it and of any dirt which may possibly accumulate therein; more sensitive and accurate, as well as more efficient in its action than such valves heretofore in general use.

Another and important object of the invention is to so construct the device that the valve shall open fully to permit the above mentioned self-cleaning, and furthermore, to furnish means for supporting and protecting the improved diaphragm, which co-operates with the valve for attaining the above named result, against the high pressures to which it may frequently be subjected.

Other objects and advantages of the invention will be disclosed in the following description and explanation, which will be more readily understood when read in conjunction with the accompanying drawing, in which an embodiment of which the invention is susceptible is illustrated, it being understood that modifications and changes may be resorted to without a departure from the essence or spirit of the invention so long as they fall within the scope of the appended claims forming a part hereof.

In the drawing,—

Fig. 1 is a central vertical sectional view of a valve embodying the improvements showing the parts in the positions they will normally occupy, or when in one of the extreme positions of the parts.

Fig. 2 is a similar view showing the parts in the positions they will occupy when in the other extreme position thereof, and Fig. 3 is a plan view of the lower section or portion of the body or housing of the valve with the diaphragm removed.

Like numerals of reference refer to like parts throughout the different views of the drawing.

The valve comprises a housing which is designated as a whole by the reference numeral 5, which housing comprises a lower section or member 7 and an upper member or section 8 both by preference substantially circular in cross-section to their axes 6—6 except where ports and openings are provided. The housing members 7 and 8 are each provided with an apertured peripheral flange at their upper and lower ends respectively, which flanges and said apertures coincide with one another. Between the flanges of the housing members 7 and 8 is interposed the improved diaphragm 9 which is circular in shape and is rendered pressure tight by means of a suitable annular gasket 10 interposed between the surface of one of the said flanges and the diaphragm and by means of bolts 11 located in the openings of said flanges. The diaphragm 9 may be made of any suitable material capable of withstanding the high pressures to which it may be subjected or exposed, but I have found Monel metal the most suitable for this purpose. In order to allow for ample up and down movements of the central portion of the diaphragm, the same has been given a dished form as is clearly shown in Figs. 1 and 2 of the drawing, but to make such a movement possible without distortion, the diaphragm is provided with a concentric groove 12 which compensates for any crowding side-wise when the diaphragm is moved upwardly. The lower housing member 7 is provided centrally thereof in its upper portion with a vertically disposed post 13 which is hollow as shown and is provided on its upper end with a circular rest 13$^a$ for the diaphragm 9 when the same is in its normal position, that is, when the diaphragm is not exposed to any pressure from below, but to the pressure on top of the diaphragm exerted by a strong coil spring. In the lower portion of the vertically and axially disposed opening with which the upper housing member 8 is provided concentrically with the common axis 6—6 is a movable hollow plunger 14 which has its bottom closed and always rests upon the top of the diaphragm. The above mentioned coil spring is designated by the numeral 15 and is located within the plunger 14 with one of its ends resting against said plunger and its other end against a cap 16 adjustably mounted on an adjusting screw 17 seated in the top of a cap or closure 18 for the cavity or axial opening of the upper member 8 of the housing, by means of which screw the tension of the spring 15 may be regulated. The cap 18 is by preference hollow as shown and is screwed into the upper part of the section 8 but in such a way as to have its lower end terminate at a distance above the hollow plunger 14 as will be readily understood by reference to Fig. 1 of the drawing. By this arrangement it is obvious that the lower end or face 19 of the hollow cap 18 will act as a stop to the outward or upward movement of the plunger 14 as well as the diaphragm. Co-inciding with the axis 6—6 the lower housing member 7 is provided with a hollow cylindrical space 20 in communication with the liquid space 21 by means of a valve casing 23 preferably of such construction as to co-operate with a needle valve 22. This valve seat or casing 23 is pressed firmly into the lower portion of the wall of the hollow space 20 but terminates at its upper end a considerable distance below the upper end of the post 13 in which the space 20 is formed. The vertical movement of the valve 22 in the seat or casing 23 therefor is effected by the coil spring 25 encircling a nut or cap 24 mounted on the stem of the valve 22 below the casing or seat 23. The displacement of the valve 22 by the movement of the diaphragm 9 is caused by a cylindrical plunger 26 which is loosely fitted in the space 20 and has in its periphery a series of vertically disposed spaced ports 29 which are co-extensive with said plunger.

For the purpose of the fine adjustment of the position of the needle valve 22 which is pressed upwardly by the spring 25, the tension of which spring can be readily adjusted or regulated by the cap 28 screwed into the lower end of the axial opening of the lower member 7 of the housing, the plunger 26 is provided centrally with a screw-threaded bore in the lower portion of which is located a screw 27 which can be turned in the proper direction for said fine adjustment of the valve, after which it may be fixed in its adjusted position by means of another screw 32 located in the upper part of the bore of the plunger 26 which when screwed down therein will abut against the upper end of the screw 27 and prevent its accidental movement, as is obvious.

It will be noted that the lower face 36 of the upper housing member 8 is concave in shape or form, which is a very important feature of the invention. It will also be understood that the upper end of the post 13 is provided with the circular seat 13ª for the support of the lower surface of the diaphragm 9 when in its normal position, which seat is divided into segments by means of radially disposed ports 30 for the passage of liquid. The upper end of this post also serves to support the superimposed mechanism on the diaphragm when the latter is in its lowest position.

The operation of the device is as follows:

As shown in Fig. 1 of the drawing, the diaphragm is located in the cavity 20ª between the housing members and is in its extreme lower position and rests upon the seat 13ª of the post 13 of the lower housing member, and in this position the needle valve 22 is fully open to the liquid space 21 to which space the liquid refrigerant may be supplied through a pipe 21ª leading from a suitable supply on the high side of the refrigerating apparatus. Now, by admitting liquid refrigerant into the said space, the same will flow through the needle valve seat 23 and from thence through the ports 29 of the plunger 26, and thence under and against the central portion of the diaphragm and from thence through the ports 30 of the seat 13ª of the central post 13 into the port 31 and from thence through an outlet pipe 31ª to the evaporator of the refrigerating system. In this operation the pressure in the evaporator will increase and this increased pressure will be exerted against the lower surface of the diaphragm, thus causing it to flex upwardly and lift the plunger 14 against the tension of the coil spring 15. The desired low pressure or back pressure of the evaporator can be regulated and maintained by increasing or decreasing the compression of the coil spring 15 by turning the adjusting screw 17 in the proper direction as is obvious. It is evident that the needle valve 22 will instantly follow any movement of the diaphragm by reason of the pressure applied to said valve by means of the spring 25 and plunger 26.

As before mentioned, there are two extreme positions of the diaphragm; the lowest position takes place when said diaphragm is resting upon the seat 13ª of the post 13, and the highest position when said diaphragm is pressed against the concave surface 36 of the upper housing member. In the meantime the top 33 of the hollow plunger 14 will have been pressed against the bottom surface 19 of the cap 18 and it is evident that the diaphragm 9 will be supported solidly by the complete concave surface, thus formed, corresponding practically to the convex surface of the diaphragm when the same occupies its extreme upper position, for it will be understood that in changing from its lowest to its uppermost position, the upper surface of the diaphragm will be changed from a concave to a convex surface. This extreme upper position corresponds to the highest pressure to which the diaphragm may be exposed, and consequently it is well able to withstand these pressures. For any intermediate or lower working pressure the diaphragm is supported centrally by the bottom surface 34 of the plunger 14 and partly by the concave surface 36 of the upper housing member 8, thereby enabling the diaphragm to carry its load without distortion. It will be understood that the greater the pressure, the more of the outer or upper surface of the diaphragm will be protected by the above described arrangement and construction of the parts, and that by my improvements a diaphragm of comparatively small thickness and of consequent great flexibility and sensitiveness, can be employed without incurring the risk of distorting the same by any of the working pressures to which said diaphragm may be exposed.

Having thus fully described my invention, what I claim as new and desire to secure by Letters Patent is:

1. In a device of the character described, a valve; and devices for regulating the position of said valve including a casing; a relatively thin, flexible metal diaphragm clamped around its periphery within said casing and provided inwardly of the clamped portions with an outer, initially formed, flat section of appreciable width and an initially preformed, central, dished section disposed to one side of the normal plane of said flat section and provided also with an integral corrugation intermediate and uniting said flat and dished sections, the outer margin of the dished section being alined with the inner margin of said flat section; and means, on opposite sides of said diaphragm, with which the latter is adapted to contact to limit the extreme opposite positions thereof.

2. An expansion valve of the character described comprising: a casing having an inlet, an outlet, a controlling valve therebetween, and an annular fixed concave surface on the interior thereof; and devices for regulating the position of said valve including; a flexible metal diaphragm clamped around its periphery adjacent said concave surface and formed inwardly of the clamped portions with an outer normally flat section of appreciable width inwardly of the clamped portion and an initially preformed central dished section disposed to one side of the plane of said flat section and provided with a single corrugation intermediate and uniting said flat and dished sections, the outer margin of the dished section being alined with the inner margin of said flat section; a fixed post on the side of the diaphragm opposite to that on which is located, said concave surface and against which the dished section is adapted to seat in one extreme position of the diaphragm; and a spring-controlled plunger on the opposite side of said diaphragm, said dished section seating against said concave surface and the adjacent end of said plunger when the dished section is in reversed condition at the other extreme position of the diaphragm.

JULIUS FRANKENBERG.